United States Patent
Sugiyama et al.

(10) Patent No.: US 9,527,748 B2
(45) Date of Patent: Dec. 27, 2016

(54) PRODUCTION PROCESS FOR NANOMETER-SIZE SILICON MATERIAL

(71) Applicant: KABUSHIKI KAISHA TOYOTA JIDOSHOKKI, Kariya-shi, Aichi (JP)

(72) Inventors: Yusuke Sugiyama, Kariya (JP); Masataka Nakanishi, Kariya (JP); Takashi Mori, Kariya (JP); Masakazu Murase, Kariya (JP); Tomohiro Niimi, Kariya (JP); Yoshihiro Nakagaki, Kariya (JP); Shigenori Koishi, Kariya (JP); Hiroshi Hirate, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 14/441,883

(22) PCT Filed: Nov. 18, 2013

(86) PCT No.: PCT/JP2013/006755
§ 371 (c)(1),
(2) Date: May 11, 2015

(87) PCT Pub. No.: WO2014/080608
PCT Pub. Date: May 30, 2014

(65) Prior Publication Data
US 2015/0307362 A1    Oct. 29, 2015

(30) Foreign Application Priority Data

Nov. 21, 2012 (JP) .................. 2012-255268
Dec. 18, 2012 (JP) .................. 2012-275622
Feb. 22, 2013 (JP) .................. 2013-033307

(51) Int. Cl.
*C01B 33/021* (2006.01)
*C01B 33/02* (2006.01)
(Continued)

(52) U.S. Cl.
CPC ............. *C01B 33/021* (2013.01); *C01B 33/02* (2013.01); *C08G 77/60* (2013.01); *C09D 183/14* (2013.01);
(Continued)

(58) Field of Classification Search
CPC ............................ C01B 33/021; C01B 33/02
See application file for complete search history.

(56) References Cited

FOREIGN PATENT DOCUMENTS

| | | |
|---|---|---|
| JP | 3865033 B2 | 1/2007 |
| JP | 2009-102219 A | 5/2009 |

(Continued)

OTHER PUBLICATIONS

Fuchs, H. D. et al., "Porous silicon and siloxene: Vibrational and structural properties", Physical Review B, Sep. 15, 1993, vol. 48, No. 11, pp. 8172-8189.

(Continued)

*Primary Examiner* — Melvin C Mayes
*Assistant Examiner* — Michael Forrest
(74) *Attorney, Agent, or Firm* — Sughrue Mion, PLLC

(57) ABSTRACT

A nanometer-size silicon material produced by heat treating a lamellar polysilane exhibits Raman-shift peaks existing at $341\pm10$ cm$^{-1}$, $360\pm10$ cm$^{-1}$, $498\pm10$ cm$^{-1}$, $638\pm10$ cm$^{-1}$, and $734\pm10$ cm$^{-1}$ in a Raman spectrum, has a large specific surface area, and has a reduced SiO content.

8 Claims, 10 Drawing Sheets

(51) Int. Cl.

| | | |
|---|---|---|
| *C08G 77/60* | (2006.01) | |
| *H01M 4/38* | (2006.01) | |
| *H01M 4/62* | (2006.01) | |
| *H01G 11/30* | (2013.01) | |
| *C09D 183/16* | (2006.01) | |
| *C09D 183/14* | (2006.01) | |
| *H01G 11/86* | (2013.01) | |
| *H01M 4/04* | (2006.01) | |
| *H01M 4/134* | (2010.01) | |
| *H01M 4/1395* | (2010.01) | |
| *H01M 4/36* | (2006.01) | |
| *H01M 10/0525* | (2010.01) | |
| *H01M 10/052* | (2010.01) | |
| *B82Y 40/00* | (2011.01) | |
| *H01M 4/02* | (2006.01) | |

(52) U.S. Cl.
CPC ............ *C09D 183/16* (2013.01); *H01G 11/30* (2013.01); *H01G 11/86* (2013.01); *H01M 4/049* (2013.01); *H01M 4/134* (2013.01); *H01M 4/1395* (2013.01); *H01M 4/366* (2013.01); *H01M 4/386* (2013.01); *H01M 4/621* (2013.01); *H01M 4/622* (2013.01); *H01M 10/0525* (2013.01); *B82Y 40/00* (2013.01); *C01P 2004/64* (2013.01); *C01P 2006/12* (2013.01); *C01P 2006/40* (2013.01); *H01M 10/052* (2013.01); *H01M 2004/021* (2013.01); *H01M 2004/027* (2013.01); *Y02E 60/122* (2013.01); *Y02E 60/13* (2013.01); *Y02T 10/7011* (2013.01); *Y02T 10/7022* (2013.01)

(56) References Cited

FOREIGN PATENT DOCUMENTS

| JP | 2011-37947 A | 2/2011 |
|---|---|---|
| JP | 2011-90806 A | 5/2011 |
| JP | 2012-169132 A | 9/2012 |
| WO | 2012/132060 A1 | 10/2012 |

OTHER PUBLICATIONS

Yamanaka, Shoji et al., "New Deintercalation Reaction of Calcium From Calcium Disilicide, Synthesis of Layered Polysilane", Materials Research Bulletin, Mar. 1996, vol. 31, No. 3, pp. 307-316.
Japanese Office Action for JP2013-033307 dated Jun. 26, 2014.
International Search Report of PCT/JP2013/006755 dated Feb. 10, 2014.
Written Opinion of PCT/JP2013/006755 dated Feb. 10, 2014 [PCT/ISA/237].

PRODUCTION PROCESS FOR NANOMETER-SIZE SILICON MATERIAL

CROSS REFERENCE TO RELATED APPLICATIONS

This application is a National Stage of International Application No. PCT/JP2013/006755 filed Nov. 18, 2013, claiming priority based on Japanese Patent Applications Nos. 2012-255268, filed Nov. 21, 2012, 2012-275622, filed Dec. 18, 2012, and 2013-033307, filed Feb. 22, 2013, the contents of all of which are incorporated herein by reference in their entirety.

TECHNICAL FIELD

The present invention relates to a nanometer-size silicon material utilizable in each of such fields as semiconductors, electric and electronic engineering and useful for a negative-electrode active material for nonaqueous-system secondary battery such as lithium-ion secondary batteries, to a production process for the same, and to an electric storage apparatus using the negative-electrode active material.

BACKGROUND ART

Lithium-ion secondary batteries have high charged and discharged capacities, and are batteries being able to make the outputs high. Currently, the lithium-ion secondary batteries have been used mainly as power sources for portable electronic appliances, and have further been expected as power sources for electric automobiles and household-use large-sized electric instruments anticipated to become widespread from now on. The lithium-ion secondary batteries comprise active materials being capable of inserting and eliminating (or sorbing and desorbing) lithium (Li) in the positive electrode and negative electrode, respectively. And, lithium ions moving within an electrolytic solution disposed between the two electrodes lead to operating the lithium-ion secondary batteries.

In the lithium-ion secondary batteries, a lithium-containing metallic composite oxide, such as lithium/cobalt composite oxides, has been used mainly as an active material of the positive electrode; whereas a carbon material having a multilayered structure has been used mainly as an active material of the negative electrode. The performance of the lithium-ion secondary batteries is dependent on materials of the positive electrode, negative electrode and electrolyte constituting the secondary batteries. Even among the materials, researches and developments of active-material ingredients forming the active materials have been carried out actively. For example, silicon or silicon oxides having a higher capacity than the capacity of carbon have been investigated as a negative-electrode active-material ingredient.

Using silicon as a negative-electrode active material enables a battery to have a higher capacity than using a carbon material. However, silicon exhibits a large volumetric changes accompanied by occluding and releasing (or sorbing and desorbing) lithium (Li) at the time of charging and discharging operations. Consequently, silicon has been pulverized finely to peel off or come off from a current collector, and thereby such a problematic issue arises probably that the charging/discharging cycle longevity of a battery is short. Hence, using a silicon oxide as a negative-electrode active material enables the volumetric changes accompanied by sorbing and desorbing lithium (Li) at the time of charging and discharging operations to be inhibited more than using silicon.

For example, employing silicon oxide (e.g., $SiO_x$ where "x" is $0.5 \leq$"x"$\leq 1.5$ approximately) has been investigated. The $SiO_x$ has been known to decompose into Si and $SiO_2$ when being heat treated. The decomposition is referred to as a "disproportionation reaction," the $SiO_x$ separates into two phases, an Si phase and an $SiO_2$ phase, by the internal reactions of solid. The Si phase separated to be obtainable is very fine. Moreover, the $SiO_2$ phase covering the Si phase possesses an action of inhibiting electrolytic solutions from being decomposed. Therefore, a secondary battery, which uses a negative-electrode active material composed of the $SiO_x$ having been decomposed into Si and $SiO_2$, excels in the cyclability.

The finer silicon particles constituting the Si phase of the above-mentioned $SiO_x$ are, the more a secondary battery using the particles as a negative-electrode active material is upgraded in the cyclability. Hence, Japanese Patent No. 3865033 (i.e., Patent Application Publication No. 1) sets forth a process for producing $SiO_x$ by heating metallic silicon and $SiO_2$ to sublime in order to turn the metallic silicon and $SiO_2$ into a silicon oxide gas, and then cooling the silicon oxide gas. The process enables the particle diameters of the silicone particles constituting the Si phase to exhibit such a nanometer size as from 1 nm to 5 nm.

Moreover, Japanese Unexamined Patent Publication (KOKAI) Gazette No. 2009-102219 (i.e., Patent Application Publication No. 2) sets forth a production process in which a silicon raw material is decomposed down to the elemental states in a high-temperature plasma, the decomposed silicon raw material is cooled quickly down to a liquid nitrogen temperature to obtain nanometer-size silicon particles, and the nanometer-size silicon particles are fixated into an $SiO_2$—$TiO_2$ matrix by a sol-gel method, and the like.

However, according to the production process set forth in Patent Application Publication No. 1, the matrix is limited to subliming materials. Moreover, according to the production process set forth in Patent Application Publication No. 2, a high energy has comes to be needed for plasma discharge. In addition, the silicon composites obtained by the production processes have such a drawback that the dispersibility of Si-phase silicon particles is so low that the particles are likely to agglomerate. When the Si particles agglomerate one another so that the particle diameters become large, a secondary battery using the agglomerated Si particles has a low initial capacity, and the cyclability also declines. Moreover, in the case of the techniques set forth in Patent Application Publication Nos. 1 and 2, since an oxide layer is needed to fixate nanometer-size silicon upon producing the silicon particles, the techniques cause an irreversible reaction to occur between the oxide layer and Li, and associate with a drawback of bringing about capacity declines as a cell.

Incidentally, nanometer-size silicon materials, which have been expected to be utilized in fields such as semiconductors, electric and electronic engineering, have been developed in recent years. For example, Physical Review B (1993), vol. 48, pp. 8,172-8,189 (i.e., Non-patent Literature No. 1) sets forth a process in which a lamellar polysilane is synthesized by reacting hydrogen chloride (HCl) and calcium disilicide ($CaSi_2$) one another. The article further sets forth that the thus obtained lamellar polysilane is utilizable for light-emitting devices, and the like.

PATENT LITERATURE

Patent Application Publication No. 1: Japanese Patent Gazette No. 3865033; and

Patent Application Publication No. 2: Japanese Unexamined Patent Publication (KOKAI) Gazette No. 2009-102219

NON-PATENT LITERATURE

Non-patent Literature No. 1: Physical Review B (1993), vol. 48, pp. 8,172-8,189

SUMMARY OF THE INVENTION

Technical Problem

However, since the lamellar polysilane set forth in Non-patent Literature No. 1 has a large specific surface area and includes the $SiO_2$ component abundantly, the lamellar polysilane has been associated with such a drawback that the lamellar polysilane is not suitable as for lithium-ion secondary-battery negative-electrode active-material ingredient. For example, in the negative electrode of a lithium-ion secondary battery, an irreversible capacity consumed by the negative electrode is large because decompositions of the electrolytic solution are facilitated when the specific surface area is large, so that turning the lithium-ion secondary battery into a high-capacity lithium-ion secondary battery is difficult. Moreover, although being Si does not result in any problem, containing the $SiO_2$ component abundantly in the negative-electrode active material has been known to cause degradations in the initial characteristic because the irreversible reaction between the $SiO_2$ component and Li becomes very much likely to occur.

The present invention is made in view of such circumstances. An object of the present invention is to provide a nanometer-size silicon material having a small specific surface area and a reduced $SiO_2$ content.

Solution to Problem

Features of a nanometer-size silicon material according to the present invention solving the aforementioned technical problems lie in that the nanometer-size silicon material produced by heat treating a lamellar polysilane, and exhibiting a Raman-shift peaks existing at $341\pm10$ cm$^{-1}$, $360\pm10$ cm$^{-1}$, $498\pm10$ cm$^{-1}$, $638\pm10$ cm$^{-1}$, and $734\pm10$ cm$^{-1}$ in a Raman spectrum.

The nanometer-size silicon material according to the present invention has desirably a BET specific surface area of 55 m$^2$/g or less, has more desirably a BET specific surface area of 25 m$^2$/g or less; includes desirably oxygen in an amount of 15% by mass or less, and more desirably includes oxygen in an amount of 10% by mass or less.

Features of a negative-electrode active material according to the present invention lie in that the negative-electrode active material comprises the present nanometer-size silicon material, and that the nanometer-size silicon material is made by laminating a plate-shaped silicon body in a quantity of multiple pieces one after another in a thickness direction.

A feature of an electric storage apparatus according to the present invention lies in that the electric storage apparatus comprises a negative electrode including the present negative-electrode active material.

Features of a production process for nanometer-size silicon material according to the present invention lie in that the production process comprises: heat treating a lamellar polysilane obtained by reacting hydrogen chloride (HCl) and calcium disilicide ($CaSi_2$) one another at a temperature beyond 300° C. under a nonoxidizing atmosphere excepting a nitrogen gas.

Moreover, features of another production process for nanometer-size silicon material according to the present invention lie in that the production process comprises: heat treating a lamellar polysilane obtained by reacting a mixture of hydrogen fluoride (HF) and hydrogen chloride (HCl), and calcium disilicide ($CaSi_2$) one another at a temperature beyond 300° C. under a nonoxidizing atmosphere excepting a nitrogen gas.

Advantageous Effects of the Invention

In accordance with a nanometer-size silicon material and negative-electrode active material according to the present invention, since the BET specific surface area is smaller than the BET specific surface of a lamellar polysilane in the raw material, inhibiting electrolytic solutions from decomposing is possible. Therefore, since the initial characteristic as the negative electrode of a lithium-ion secondary battery is improved, the present nanometer-size silicon material and negative-electrode active material are useful as a negative-electrode active material for lithium-ion secondary battery. Moreover, since adjusting the processing methods makes the specific surface area controllable, imparting an electric-conducting property to the reaction sites is possible, or imparting an insulating property to the present nanometer-size silicon material and negative-electrode active material is made possible by loading an insulative material onto the present nanometer-size silicon material and negative-electrode active material, and thereby developing uses or applications of the present materials as various electronic-device materials is expected.

And, in accordance with the production processes according to the present invention, the present nanometer-size silicon material and negative-electrode active material are producible easily and securely.

DESCRIPTION OF THE EMBODIMENTS

Figure 1:
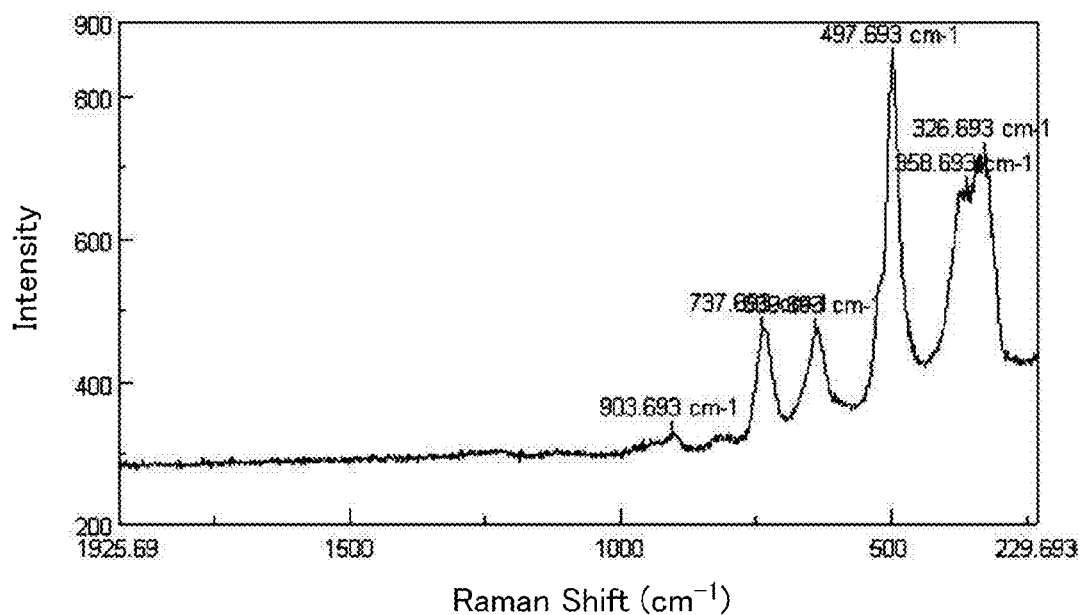
FIG. 1 is a Raman spectrum of a lamellar polysilane.
Figure 2:
FIG. 2 is a Raman spectrum of single-crystal silicon.

The inventors named in the present application carried out wholehearted studies regarding the lamellar polysilane set forth in Non-patent Literature No. 1, and paid attention to the Raman spectrum therein. In general, a Raman shift has been known that bonds become strong when the Raman shift shifts toward the high-frequency side, and that bonds are likely to be cut off when the Raman shift shifts toward the low-frequency side. FIG. 1 shows a Raman spectrum of the lamellar polysilane; whereas FIG. 2 shows a Raman spectrum of single-crystal silicon. From the comparison between FIG. 1 and FIG. 2, when noticing a peak of the Si—Si bond observed at 500 $cm^{-1}$ in the single-crystal silicon, the peak was found out to shift to the low-frequency side at around 320 $cm^{-1}$ in the lamellar polysilane, compared with the single-crystal silicon.

That is, having a lamellar polysilane structure led to weakening the Si—Si bond, and to resulting in predicting that making nanometer-size silicon under a mild condition becomes feasible. And, heat treating a lamellar polysilane at a temperature beyond 300° C. in a nonoxidizing atmosphere excepting a nitrogen gas was discovered to lead to making a nanometer-size silicon material being porous and having a reduced oxygen amount obtainable, and thereby the present invention was completed.

In a first production process according to the present invention, hydrogen chloride (HCl), and calcium disilicide ($CaSi_2$) are reacted one another to obtain a lamellar polysilane. The lamellar polysilane corresponds to the lamellar polysilane set forth in Non-patent Literature No. 1, and comprises a lamellar polysilane which has a structure in which multiple six-membered rings constituted of a silicon atom are disposed one after another, and which is expressed by a compositional formula, $(SiH)_n$, as a basic skeleton. Heat treating the lamellar polysilane at a temperature beyond 300° C. under a nonoxidizing atmosphere leads to obtaining a nanometer-size silicon material of which the average particle diameter is 5 nm approximately, and which exhibits Raman-shift peaks existing at 341±10 $cm^{-1}$, 360±10 $cm^{-1}$, 498±10 $cm^{-1}$, 638±10 $cm^{-1}$, and 734±10 $cm^{-1}$ in a Raman spectrum. Since the lamellar-polysilane structure is maintained as such by heat treatments at 300° C. or less, no nanometer-size silicon is obtainable.

Although a time for the heat treatment depends on the heat-treatment temperature, one hour is sufficient as far as being a 500° C. heat treatment.

Depending on production conditions of the lamellar polysilane, the specific surface area and oxygen amount of obtainable lamellar polysilane have been found out to change, and the specific surface area of nanometer-size silicon obtainable by heat treating the obtained lamellar polysilane, and an amount of oxygen existing as silicon oxides in nanometer-size silicon have been found out to change. In Non-patent Literature No. 1, hydrogen chloride (HCl) and calcium disilicide ($CaSi_2$) are reacted one another to obtain the lamellar polysilane. The calcium disilicide ($CaSi_2$) has a lamellar crystal in which Ca-atom layers are inserted between the (111) planes of diamond-type Si, then the calcium (Ca) is pulled off therefrom by the reaction with an acid, and thereby a lamellar polysilane is obtainable.

However, using a mixture of hydrogen fluoride (HF) and hydrogen chloride (HCl) as the acid for pulling off Ca made the following apparent: the oxygen content of obtainable lamellar polysilane becomes less, though the specific surface area augments.

In a second production process according to the present invention, a mixture of hydrogen fluoride (HF) and hydrogen chloride (HCl), and calcium disilicide ($CaSi_2$) are reacted one another. In the production process, a mixture of hydrogen fluoride (HF) and hydrogen chloride (HCl) is used as an acid. Using hydrogen fluoride (HF) leads to etching SiO generating during the synthesis or during the purification, and accordingly the oxygen amount is reduced. Even when using hydrogen fluoride (HF) alone, a lamellar polysilane is obtainable, but using hydrogen fluoride (HF) alone is not preferable because the lamellar polysilane is highly active so as to be oxidized by a trace amount of air to conversely augment the oxygen amount. Moreover, when using hydrogen chloride (HCl) alone, since the setting becomes identical with Non-patent Literature No. 1, only a lamellar polysilane of which the oxygen amount is abundant is obtainable.

A desirable compositional ratio between the hydrogen fluoride (HF) and the hydrogen chloride (HCl) falls in such a range as HF/HCl=from 1/10,000 to 1/1 by mol. An amount of the hydrogen fluoride (HF) being more than the ratio is not preferable, because impurities, such as $CaF_2$ and CaSiO-based impurities, generate and because separating the impurities from a lamellar polysilane is difficult. Moreover, when an amount of the hydrogen fluoride (HF) becomes less than the ratio, such a case arises probably as the effect of etching resulting from HF weakens.

A desirable blending ratio between the mixture of hydrogen fluoride (HF) and hydrogen chloride (HCl) and the calcium disilicide ($CaSi_2$) is to set the acids more excessive than the equivalent to the latter. In an actual reaction the hydrogen fluoride (HF) and Si react one another as a side reaction so that $SiF_4$ occurs but $CaF_2$ hardly generates. Moreover, the reaction is carried out under such a desirable reaction atmosphere as under a vacuum or under an inert-gas atmosphere. Carrying out the reaction under a nitrogen-gas atmosphere is not preferable, because such a possibility arises as silicon nitride (SiN) generates. Note that the second production process according to the present invention was also revealed to make the reaction time short compared with the production process according to Non-patent Literature No. 1. Since Si and HF further react one another so that $SiF_4$ has occurred when the reaction time is too long, a sufficient reaction time is from 0.25 to 24 hours approximately. Even when the reaction temperature is set at room temperature, the mixture and the $CaSi_2$ react one another with ease.

Although the reaction results in generating $CaCl_2$, and the like, the purification of a lamellar polysilane is easy because the by-products are easily removable by washing with water.

Although the specific surface area of the lamellar polysilane produced by the production process set forth in Non-patent Literature No. 1 is as relatively small as about 20 m²/g approximately, the specific surface area of a lamellar polysilane produced by the second production process according to the present invention is as large as about 122.3 m²/g approximately, as set forth in "Second Example."

Consequently, although the specific surface area of nanometer-size silicon obtained by heat treating the lamellar polysilane produced by the production process set forth in Non-patent Literature No. 1 is as small as about 7 m²/g approximately, the specific surface area of nanometer-size silicon obtained by heat treating the lamellar polysilane produced by the second production process according to the present invention is as large as about 52.2 m²/g. However, the specific surface area is small remarkably compared with the specific surface areas of the lamellar polysilanes, and since the specific surface area is 55 m²/g or less, no problem arises from practical standpoints.

Although the oxygen amount of the lamellar polysilane produced by the production process set forth in Non-patent Literature No. 1 is as relatively abundant as about 40% by mass, the oxygen amount of the lamellar polysilane produced by the second production process according to the present invention is as extremely less as 30% by mass or less. Note that the oxygen amounts are numerical values measured with an energy-dispersion X-ray spectroscopy (or EDX).

And, although the oxygen amount of nanometer-size silicon obtained by heat treating the lamellar polysilane produced by the production process set forth in Non-patent Literature No. 1 is as large as about 39% by mass, the oxygen amount of nanometer-size silicon obtained by heat treating the lamellar polysilane produced by the second production process according to the present invention is as small as 20% by mass or less.

Heat treating a lamellar polysilane at a temperature beyond 300° C. in a nonoxidizing atmosphere excepting a nitrogen gas leads to making a nanometer-size silicon material according to the present invention obtainable. As for the nonoxidizing atmosphere, an inert-gas atmosphere, or a vacuum atmosphere is exemplified. The inert gas is not prescribed at all especially as far as the inert gas is nitrogen, argon or helium, and the like, which does not include any oxygen. Moreover, a preferable heat-treatment temperature falls in a range of from 300° C. to 800° C., and an especially preferable heat-treatment temperature falls in a range of from 400° C. to 600° C.

A preferable Si-crystallite size of the thus obtainable nanometer-size silicon material falls in a range of from 0.5 to 300 nm when using the nanometer-size silicon material as an electrode active material of the present electric storage apparatus. A desirable Si-crystallite size falls in a range of from 1 nm to 50 nm, and an especially desirable Si-crystallite size further falls in a range of from 1 nm to 10 nm. Note that the crystallite size is computed by the Scherrer equation from a half-value width of a diffraction peak in the (111) plane according to the result of an X-ray diffraction measurement. And, since the nanometer-size silicon material according to the present invention is porous and has a less oxygen content, the present nanometer-size silicon material is useful extremely as a secondary-battery negative-electrode active material.

Structure of Nanometer-Size Silicon Material

Figure 13:
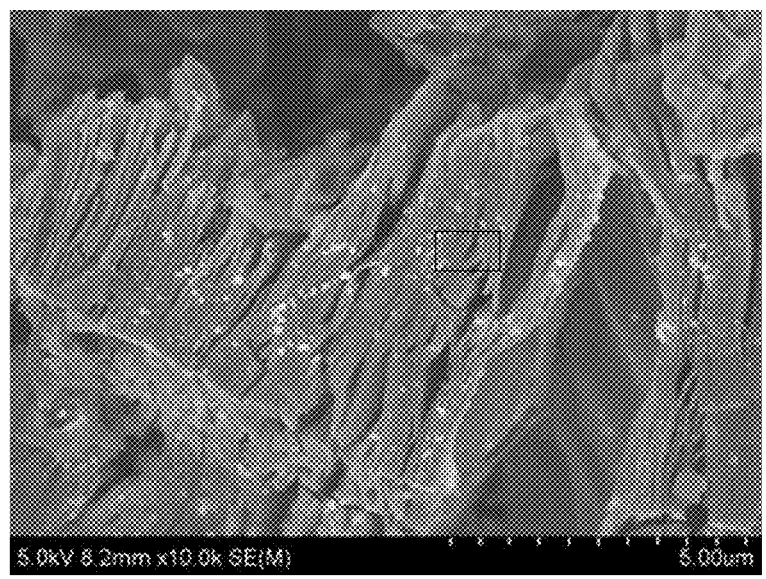
FIG. 13 shows an SEM image of a nanometer-size silicon material directed to Second Example.
Figure 14:
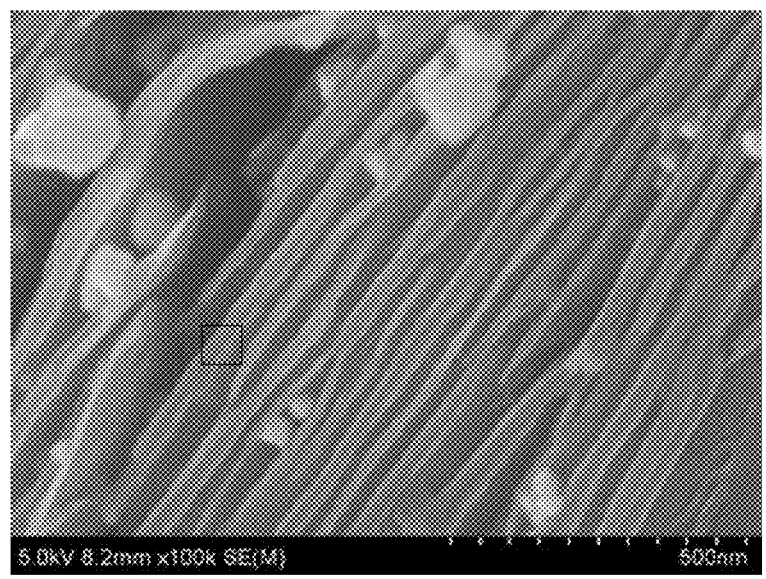
FIG. 14 shows an enlarged SEM image of the nanometer-size silicon material directed to Second Example.

The nanometer-size silicon material and negative-electrode active material according to the present invention comprise a structure made by laminating a plate-shaped silicon body in a quantity of multiple pieces one after another in the thickness direction. As shown in FIGS. 13 and 14, the structure is ascertainable by an SEM observation. Note that FIG. 14 shows a diagram in which the rectangled part shown in FIG. 13 is enlarged. Although the plate-shaped silicon bodies are observed to have a thickness of from about 10 nm to about 100 nm, a preferable thickness of the plate-shaped silicon bodies falls in a range of from 20 nm to 50 nm, from such viewpoints as the strength and the easiness of inserting lithium ions and so on thereinto and separating the ions therefrom. Moreover, the plate-shaped silicon bodies had actually a long-axis-direction length of from 0.1 µm to 50 µm, respectively. Note that preferable plate-shaped silicon bodies are believed to exhibit such an aspect ratio (i.e., "the long-axis-direction length"/"thickness") as from 2 to 1,000, respectively.

Figure 15:
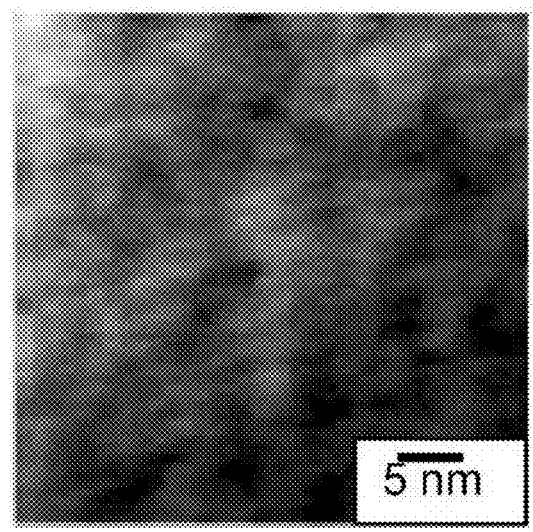
FIG. 15 shows a TEM/EELS image of the nanometer-size silicon material directed to Second Example.
Figure 16:
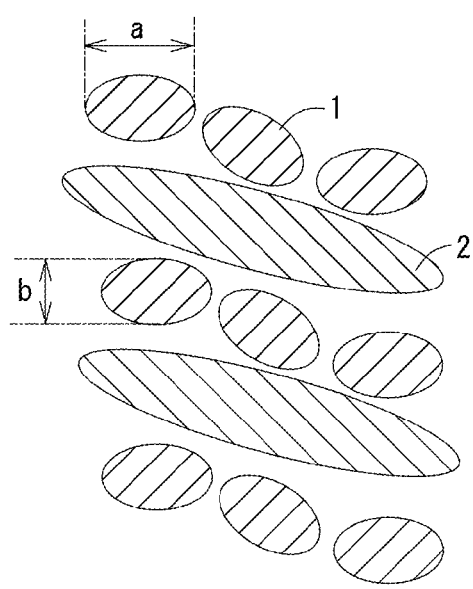
FIG. 16 is a schematic cross-sectional diagram showing a major part of a plate-shaped silicon body directed to Second Example enlargedly.

In accordance with TEM (i.e., transmission electron microscopy)/EELS (i.e., electron energy loss spectroscopy), a shaded stripe-shaped structure is noticeable in the plate-shaped silicon bodies, as shown in FIG. 15. Note that FIG. 15 shows a diagram in which the squared part shown in FIG. 14 is enlarged, and that FIG. 16 shows a schematic cross-sectional diagram illustrating a major part of the plate-shaped silicon bodies enlargedly. The light gray-colored parts shown in FIG. 15 are believed to have a structure in which flat-shaped nanometer-size silicon particles "1" are oriented perpendicularly with respect to the long sides to arrange lamellarly; whereas the dark gray-colored parts existing between layers of the respective flat-shaped nanometer-size silicon particles "1" are believed to be voids and/or silicon oxides "2." The flat-shaped nanometer-size silicon particles "1" have a long-axis-direction length "a" of from 5 nm to 20 nm, have a short-axis-direction length "b" of from 2 to 5 nm, and have a ratio "a/b," namely, a ratio between the long axis and the short axis, which falls in a range of from 2.5 to 10. Moreover, a thickness of the voids and/or silicon oxides "2" is from 2 nm to 10 nm, and accordingly a ratio of the thickness of the voids and/or silicon oxides "2" with respect to the thickness of the flat-shaped nanometer-size silicon particles "1" comes to fall in a range of from 0.1 to 1.

Negative Electrode

The following steps enable the negative electrode of a nonaqueous-system secondary battery, for instance, to be fabricated using the negative-electrode active material according to the present invention: adding a proper amount of an organic solvent to a powder of the negative-electrode active material, a conductive additive like a carbon powder, if needed, and a binder to mix the components one another to turn the components into a slurry; coating the slurry onto a current collector by such a method as a roll-coating method, a dip-coating method, a doctor-blade method, a spray-coating method or a curtain-coating method; and then drying or curing the binder.

The binder is required to bind the active material, and so on, together in an amount as less as possible. However, a desirable addition amount of the binder is from 0.5% by weight to 50% by weight to a summed amount of the active material, conductive additive and binder. When the binder is less than 0.5% by weight, the formability of an electrode declines; whereas the energy density of an electrode becomes low when the addition amount exceeds 50% by weight.

For the binder, the following are exemplified: polyvinylidene fluoride (e.g., polyvinylidene difluoride (or PVdF)), polytetrafluoroethylene (or PTFE), styrene-butadiene rubber (or SBR), polyimide (or PI), polyamide-imide (or PAI), carboxymethyl cellulose (or CMC), polyvinylchloride (or PVC), acrylic resins, methacrylic resins, polyacrylonitrile (or PAN), modified polyphenylene oxide (or PPO), polyethylene oxide (or PEO), polyethylene (or PE), polypropylene (or PP), polyacrylic acids (or PAA), and the like. Among the options, using polyvinylidene fluoride (e.g., polyvinylidene difluoride (or PVdF)) enables the present negative electrode to lower in the potential so that upgrading the present electric storage apparatus in the voltage becomes feasible. Moreover, as the binder, using polyamide-imide (or PAI), or polyacrylic acids (or PAA) upgrades initial efficiency and cyclability.

A "current collector" means a chemically inactive high electron conductor for keeping an electric current flowing to electrodes during discharging or charging operations. Although a configuration, such as a foil or a plate, is adoptable for the current collector, the configuration is not at all limited especially as far as the configuration conforms to objectives. As the current collector, copper foils, and aluminum foils are usable suitably, for instance.

As the negative-electrode active material, the following publicly-known active materials, for instance, are also mixable with the above-mentioned nanometer-size silicon material: graphite, hard carbon, silicon, carbon fibers, tin (Sn), silicon oxide, and the like. Among the publicly-known active materials, a silicon oxide expressed by $SiO_x$ (where $0.3 \leq "x" \leq 1.6$) is preferable especially. Each of particles in a powder of the silicon oxide is composed of $SiO_x$ having been decomposed into fine Si, and $SiO_2$ covering the Si by a disproportionation reaction. When the "x" is less than the lower-limit value, volumetric changes become too large at the time of charging and discharging operations because the Si ratio becomes so high, and thereby cyclability declines. Moreover, when the "x" exceeds the upper-limit value, the Si ratio declines so that energy density comes to decline. A preferable range is $0.5 \leq "x" \leq 1.5$, and a more desirable range is $0.7 \leq "x" \leq 1.2$.

In general, when being put under such a condition that oxygen is cut off, almost all of SiO has been said to undergo disproportionation to separate into two phases at 800° C. or more. To be concrete, a silicon-oxide powder, which includes two phases, namely, a noncrystalline $SiO_2$ phase and a crystalline Si phase, is obtainable by carrying out to a raw-material silicon-oxide powder including a noncrystalline SiO powder a heat treatment at from 800 to 1,200° C. for from 1 to 5 hours in an inert atmosphere, such as in a vacuum or in an inert gas.

Moreover, as the silicon oxide, a composite is usable, composite in which a carbon material is composited with the SiO in an amount of from 1 to 50% by mass. Compositing a carbon material upgrades cyclability. When a composited amount of the carbon material is less than 1% by mass, the advantageous effect of upgrading conductivity is not obtainable; whereas, when the composited amount exceeds 50% by mass, a proportion of the SiO decreases relatively so that the capacity of a negative electrode has declined. A preferable composited amount of the carbon material falls in a range of from 5 to 30% by mass to the $SiO_x$, and a more desirable composite amount falls in a range of from 5 to 20% by mass thereto. A CVD method, or the like, is utilizable to composite the carbon material with the $SiO_x$.

A desirable silicon-oxide powder has an average particle diameter falling in a range of from 1 μm to 10 μm. When the average particle diameter is larger than 10 μm, the charging and discharging characteristics of an electric storage apparatus decline; whereas, when the average particle diameter is smaller than 1 μm, such a case arises probably that the charging and discharging characteristics of an electric storage apparatus decline similarly because the powder agglomerates to make coarse particles.

The conductive additive is added in order to enhance the electrically-conducting property of an electrode. As the conductive additive, the following are addable independently, or two or more of the following are combinable to add: carbonaceous fine particles, such as carbon black, graphite, acetylene black (or AB) and KETJENBLACK (or KB (registered trademark)); and gas-phase-method carbon fibers (or vapor-grown carbon fibers (or VGCF)). Although an employment amount of the conductive additive is not at all restrictive especially, setting the employment amount is possible at from 20 to 100 parts by mass approximately with respect to 100-part-by-mass active materials, for instance. When an amount of the conductive additive is less than 20 parts by mass, conductive passes with good efficiency are not formable; whereas, when the amount exceeds 100 pars by mass, not only the formability of an electrode worsens but also the energy density thereof becomes low. Note that, when using the silicon oxide composited with a carbon material as an active material, reducing an addition amount of the conductive additive, or making the addition amount none is possible.

To the organic solvent, any restrictions are not at all imposed especially, and even a mixture of multiple solvents does not matter at all. An especially preferable solvent is N-methyl-2-pyrrolidone, or a mixed solvent of N-methyl-2-pyrrolidone and an ester-based solvent (such as ethyl acetate, n-butyl acetate, butyl cellosolve acetate, or butyl carbitol acetate) or a glyme-based solvent (such as diglyme, triglyme, or tetraglyme).

When an electric storage apparatus possessing the above-mentioned negative electrode makes a lithium-ion secondary battery, pre-doping the negative electrode with lithium is also possible. To dope the negative electrode with lithium, such an electrode chemically-forming technique is utilizable as assembling a half cell using metallic lithium for one of the counter electrodes and then doping the negative electrode with lithium electrochemically. The doping amount of lithium is not at all restricted especially.

Lithium-Ion Secondary Battery

Being a lithium-ion secondary battery possessing the above-mentioned negative electrode, publicly-known positive electrodes, electrolytic solutions and separators are usable without any special limitations at all. An allowable positive electrode is positive electrodes being employable in nonaqueous-system secondary batteries. The positive electrode comprises a current collector, and a positive-electrode active-material layer bound together onto the current collector. The positive-electrode active-material layer includes a positive-electrode active material, and a binder, but the positive-electrode active-material layer further including a conductive additive is also permissible. The positive-electrode active material, conductive additive and binder are not at all limited especially, and accordingly are allowed to be constituent elements being employable in nonaqueous-system secondary batteries.

As for the positive-electrode active material, the following are given: metallic lithium, $LiCoO_2$, $LiNi_{1/3}Co_{1/3}Mn_{1/3}O_2$, $Li_2MnO_3$, sulfur, and the like. An allowable current collector is current collectors, such as aluminum, nickel and stainless steels, to be commonly employed for the positive electrodes of lithium-ion secondary batteries. An employable conductive additive is the same as the conductive additives set forth in the negative electrode mentioned above.

The electrolytic solution is a solution in which a lithium metallic salt, namely, an electrolyte, has been dissolved in an organic solvent. The electrolytic solution is not at all limited especially. As the organic solvent, an aprotic organic solvent is usable. For example, at least one member selected from the group consisting of the following is usable: propylene carbonate (or PC), ethylene carbonate (or EC), dimethyl carbonate (or DMC), diethyl carbonate (or DEC), ethyl methyl carbonate (or EMC), and the like. Moreover, as for the electrolyte to be dissolved, a lithium metallic salt, such as $LiPF_6$, $LiBF_4$, $LiAsF_6$, LiI, $LiClO_4$ or $LiCF_3SO_3$, being soluble in the organic solvent is usable.

For example, the following solution is employable: a solution comprising a lithium metallic salt, such as $LiClO_4$, $LiPF_6$, $LiBF_4$ or $LiCF_3SO_3$, dissolved in a concentration of from 0.5 mol/L to 1.7 mol/L approximately in an organic solvent, such as ethylene carbonate, dimethyl carbonate, propylene carbonate or dimethyl carbonate.

The separator is not at all limited especially as far as being separators being capable of being employed for nonaqueous-system secondary batteries. The separator is one of the constituent elements isolating the positive electrode and negative electrode from one another and retaining the electrolytic solution therein, and accordingly a thin microporous membrane, such as polypropylene or polyethylene, is usable.

Being a lithium-ion secondary battery possessing the above-mentioned negative electrode, the configuration is not at all limited especially, and accordingly various configurations, such as cylindrical types, rectangular types and coin types, are adoptable. Even when any one of the configurations is adopted, the separators are interposed or held between the positive electrodes and the negative electrodes to make electrode assemblies. Then, after connecting intervals from the positive-electrode current collectors and negative-electrode current collectors up to the positive-electrode terminals and negative-electrode terminals, which lead to the outside, with leads for collecting electricity, and the like, the electrode assemblies are sealed hermetically in a battery case along with the electrolytic solution, thereby turning the positive-electrode and negative-electrode assemblies into a battery.

Being a lithium-ion secondary battery, the lithium-ion secondary battery is desirably ascertained nondestructively to confirm whether or not the lithium-ion secondary battery comprises a negative electrode using the negative-electrode active material according to the present invention. Hence, a relationship between voltages (V) and charged capacities (Q) of the negative electrode is found when the lithium-ion secondary battery is charged at predetermined electric-current values, thereby preparing a V-dQ/dV curve expressing a relationship between the voltages (V) and dQ/dV, namely, a proportion of a variation magnitude (dQ) of the charged capacities (Q) with respect to a variation magnitude (dV) of the voltages (V). And, a proportion of a dQ/dV value when the voltage (V) is 0.45 V±0.02 V with respect to another dQ/dV value when the voltage (V) is 0.5 V±0.2 V is computed. The computed value being 1.10 or more enables the lithium-ion secondary battery to be regarded as comprising a negative electrode using the negative-electrode active material according to the present invention.

The value at the time of 0.5 V±0.02 V is adopted herein because the value is a specific peak position to lithium-ion secondary batteries using SiO-based negative-electrode active materials. Moreover, the other value at the time of 0.45 V±0.02 V is adopted because the value is a specific peak position to lithium-ion secondary batteries directed to the present invention. Note that, since such a case probably arises as the peak positions change when the electric currents are large at the time of charging operations, measuring the values is needed within a rate range of from 0.01 C to 0.2 C, namely, within a range of fully low electric-current values.

EXAMPLES

The embodiment modes of the present invention are hereinafter explained in detail by describing examples and comparative examples thereof.

First Example 20-mL HCl aqueous solution with a concentration of 36% by weight was cooled to 0° C. in an ice bath, and 2-g calcium disilicide ($CaSi_2$) was added to the aqueous solution and was then stirred therein in an argon-gas atmosphere. After confirming that bubbling had completed, the temperature was increased up to room temperature, and then the mixture was further stirred at room temperature for two hours. Then, after adding 20-mL distilled water to the mixture, the mixture was further stirred for 10 minutes. On the occasion, a yellow-colored powder floated.

The obtained mixed solution was filtered, and a residue was then washed with 10-mL distilled water. After further washing the residue with 10-mL ethanol, the residue was vacuum dried to obtain 2-g lamellar polysilane. FIG. 1 shows a Raman spectrum of the lamellar polysilane.

Figure 3:
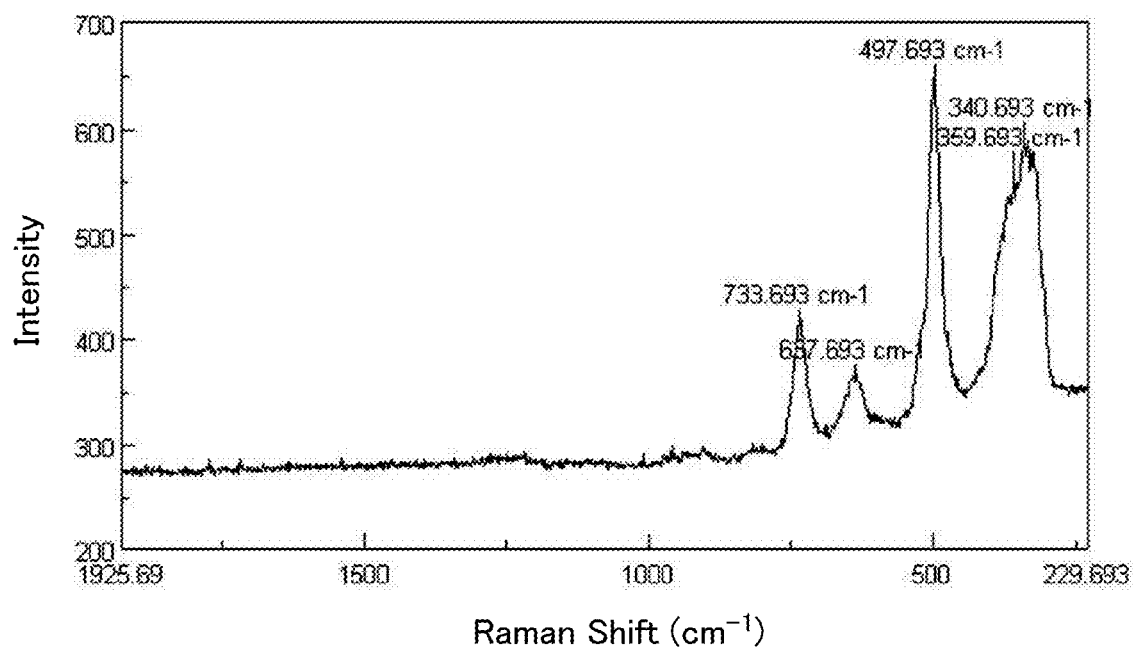
FIG. 3 is a Raman spectrum of a nanometer-size silicon powder directed to First Example.

The lamellar polysilane was weighed out in an amount of 1 g, and underwent a heat treatment in which the weighed-out lamellar polysilane was retained at 500° C. for 1 hour within an argon gas including $O_2$ in an amount of 1% by volume or less. FIG. 3 shows a Raman spectrum of the thus obtained nanometer-size silicon powder. Raman-shift peaks were seen to exist at 341±10 $cm^{-1}$, 360±10 $cm^{-1}$, 498±10 $cm^{-1}$, 638±10 $cm^{-1}$, and 734±10 $cm^{-1}$.

Second Example

A mixed solution of 7-mL HF aqueous solution with a concentration of 46% by mass and 56-mL HCl aqueous solution with a concentration of 36% by weight was cooled to 0° C. in an ice bath, and 3.3-g calcium disilicide ($CaSi_2$) was added to the mixed solution and was then stirred therein in an argon-gas atmosphere. After confirming that bubbling had completed, the temperature was increased up to room temperature, and then the mixture was further stirred at room temperature for two hours. Then, after adding 20-mL distilled water to the mixture, the mixture was further stirred for 10 minutes. On the occasion, a yellow-colored powder floated.

The obtained mixed solution was filtered, and a residue was then washed with 10-mL distilled water. After further washing the residue with 10-mL ethanol, the residue was vacuum dried to obtain 2.5-g lamellar polysilane.

The lamellar polysilane was weighed out in an amount of 1 g, and underwent a heat treatment in which the weighed-out lamellar polysilane was retained at 500° C. for 1 hour within an argon gas including $O_2$ in an amount of 1% by volume or less. A Raman spectrum of the thus obtained nanometer-size silicon powder was equivalent to the Raman spectrum of the nanometer-size silicon according to First Example, and accordingly Raman-shift peaks were seen to exist at 341±10 cm$^{-1}$, 360±10 cm$^{-1}$, 498±10 cm$^{-1}$, 638±10 cm$^{-1}$, and 734±10 cm$^{-1}$.

First Comparative Example

Other than setting the heat-treatment temperature for the lamellar polysilane at 300° C., First Comparative Example was the same as First Example.

X-Ray Diffraction Analysis

Figure 4:
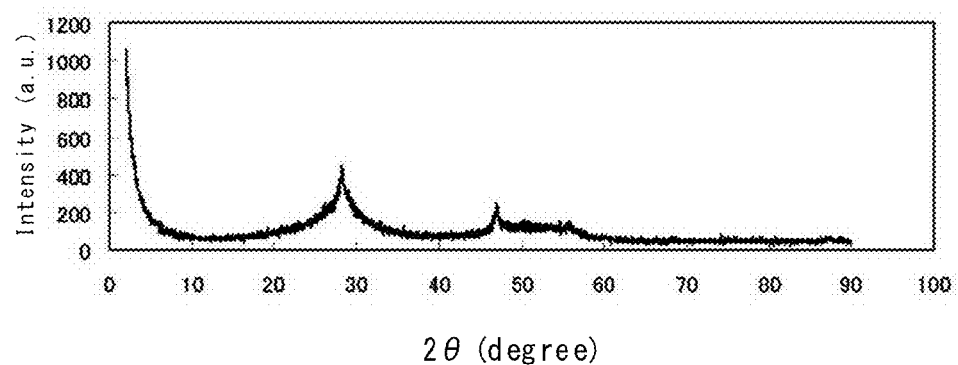
FIG. 4 is an X-ray diffraction spectrum of the nanometer-size silicon powder obtained in First Example.
Figure 5:
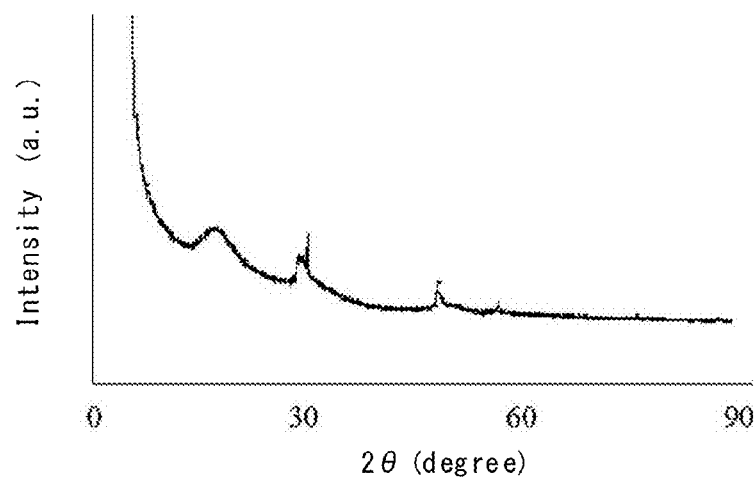
FIG. 5 is an X-ray diffraction spectrum of a nanometer-size silicon powder obtained in First Comparative Example.

An X-ray diffraction measurement (or XRD measurement) using the CuK$_\alpha$ ray was carried out to the powders obtained in First Example and First Comparative Example. FIG. 4 and FIG. 5 show the diffraction spectra, respectively. From the half-value width found in FIG. 4, the nanometer-size silicon according to First Example is suggested to have a crystallite size of 5 nm approximately. Moreover, because the X-ray diffraction spectrum shown in FIG. 5 was identical with another not-shown X-ray diffraction spectrum of the used lamellar polysilane, the following were found out: the structural change to nanometer-size silicon is difficult when the heat-treatment temperature is 300° C. as done in First Comparative Example; and a temperature beyond 300° C. is needed to turn the lamellar polysilane into nanometer-size silicon.

Analysis on Specific Surface Area

The lamellar polysilane and nanometer-size silicon material prepared in First and Second Examples were measured for the specific surface areas by a BET method, respectively. Table 1 shows the results. Table 1 suggests that the production process according to Second Example augmented the specific surface area more than did the production process according to First Example. However, turning the lamellar polysilane into nanometer-size silicon as a whole resulted in decreasing the specific surface areas, which were smaller than 120 m$^2$/g, the specific surface area of commercially available Si particles having an average particle diameter of 50 nm.

TABLE 1

|  | Acid Species | Specific Surface Area (m$^2$/g) | |
|---|---|---|---|
|  |  | Lamellar Polysilane | Nanometer-size Silicon |
| First Example | HCl | 20.0 | 6.9 |
| Second Example | HF + HCl | 122.3 | 52.2 |

Analysis on Oxygen Concentration

The lamellar polysilane and nanometer-size silicon material prepared in First and Second Examples were measured for the respective amounts of included oxygen with an energy-dispersion X-ray spectroscopy (or EDX). Table 2 shows the results. The production process according to Second Example led to obtaining the nanometer-size silicon of which the included-oxygen amount was declined more than the included-oxygen amount in the nanometer-size silicon obtained by the production process according to First Example.

TABLE 2

|  | Acid Species | Oxygen Amount (% by mass) | |
|---|---|---|---|
|  |  | Lamellar Polysilane | Nanometer-size Silicon |
| First Example | HCl | 40.0 | 38.6 |
| Second Example | HF + HCl | 28.7 | 13.0 |

Lithium-Ion Secondary Battery

Slurries were prepared by mixing the following one another, respectively: nanometer-size silicon powders obtained in First and Second Examples in an amount of 45 parts by mass; a natural-graphite powder in an amount of 40 parts by mass; acetylene black in an amount of 5 parts by mass; and a binder solution in an amount of 33 parts by mass. For the binder solution, a solution comprising polyamide-imide (or PAI) dissolved in N-methyl-2-pyrrolidone (or NMP) in an amount of 30% by mass was used. The slurries were coated onto a surface of an electrolyzed copper foil (i.e., a current collector) having about 20 μm in thickness using a doctor blade, respectively, thereby forming a negative-electrode active-material layer on the copper foil, respectively. Thereafter, the current collector and the negative-electrode active-material layer were adhesion joined firmly by a roll pressing machine. The adhesion-joined substances were vacuum dried at 200° C. for 2 hours, respectively, thereby forming a negative electrode of which the negative-electrode active-material layer had a thickness of 16 μm, respectively.

Using as an evaluation electrode the negative electrodes fabricated through the procedures mentioned above, a lithium secondary battery (i.e., a half cell) was fabricated, respectively. A metallic lithium foil with 500 μm in thickness was set as the counter electrode.

The counter electrode was cut out to φ14 mm, and the evaluation electrode was cut out to φ11 mm. Then, a separator composed of a glass filter produced by HOECHST CELANESE Corporation and "Celgard 2400" produced by CELGARD Corporation was set or held between the two to make an electrode-assembly battery. The electrode-assembly battery was accommodated in a battery case (e.g., a member for CR2032-type coin battery, a product of HOSEN Co., Ltd.). A nonaqueous electrolytic solution was injected into the battery case. Note that the nonaqueous electrolytic solution comprised a mixed solvent composed of ethylene carbonate and diethyl carbonate mixed one another in a ratio of 1:1 by volume, and LiPF$_6$ dissolved in the mixed solvent in a concentration of 1M. Then, the battery case was sealed hermetically to obtain lithium secondary batteries according to First and Second Examples, respectively.

Test on Battery Characteristics

The lithium-ion secondary batteries according to First and Second Examples were measured for the initial charged and discharged capacities upon being charged with 1 V. Table 3 shows the results. Moreover, the initial efficiencies (i.e., (Charged Capacities)/(Discharged Capacities)) were computed. Table 3 shows the results.

TABLE 3

| | Acid Species | Discharged Capacity | Charged Capacity | Initial Efficiency |
|---|---|---|---|---|
| First Example | HCl | 697 mAh/g | 380 mAh/g | 54.5% |
| Second Example | HF + HCl | 1200 mAh/g | 847 mAh/g | 70.6% |

From Table 3, the initial efficiency, and the charged and discharged capacities were found out to upgrade, compared with First Example, by setting as a negative-electrode active material the nanometer-size silicon material which was made from the lamellar polysilane produced by the production process directed to Second Example, of which the specific surface area was 55 m²/g or less, and of which the oxygen amount was 30% by mass or less.

Third Example

A slurry was prepared by mixing the following one another: a nanometer-size silicon powder produced in Second Example in an amount of 45 parts by mass; a natural-graphite powder in an amount of 40 parts by mass; acetylene black in an amount of 5 parts by mass; and a binder solution in an amount of 33 parts by mass. For the binder solution, a solution comprising a polyacrylic acid (or PAA) dissolved in N-methyl-2-pyrrolidone (or NMP) in an amount of 30% by mass was used. The slurry was coated onto a surface of an electrolyzed copper foil (i.e., a current collector) having about 20 μm in thickness using a doctor blade, thereby forming a negative-electrode active-material layer on the copper foil. Thereafter, the current collector and the negative-electrode active-material layer were adhesion joined firmly by a roll pressing machine. The adhesion-joined substance was vacuum dried at 200° C. for 2 hours, thereby forming a negative electrode of which the negative-electrode active-material layer had a thickness of 16 μm.

Using as an evaluation electrode the negative electrode fabricated through the procedures mentioned above, a lithium secondary battery (i.e., a half cell) was fabricated in the same manner as First Example.

Fourth Example

Other than using a binder solution comprising polyvinylidene fluoride (or PVdF) dissolved in N-methyl-2-pyrrolidone (or NMP) in an amount of 30% by mass, a negative electrode was formed in the same manner as Third Example. Then, a lithium secondary battery (i.e., a half cell) was fabricated likewise.

Second Comparative Example

Other than using, instead of the nanometer-size silicon power, Si particles (produced by KOJUNDO KAGAKU Corporation, and having an average particle diameter of 5 μm) in an identical amount, a negative electrode was formed in the same manner as Third Example. Then, a lithium secondary battery (i.e., a half cell) was fabricated likewise.

Test on Battery Characteristics

The lithium secondary batteries according to Third and Fourth Examples and Second Comparative Example were measured for the initial discharged capacities upon being charged with 1 V. Table 4 shows the results. Moreover, the initial efficiencies (i.e., (Charged Capacities)/(Discharged Capacities)) were computed. Table 4 shows the results.

TABLE 4

| | Acid Species | Binder | Discharged Capacity | Initial Efficiency |
|---|---|---|---|---|
| Third Example | HF + HCl | PAA | 1120 mAh/g | 76.0% |
| Fourth Example | HF + HCl | PVdF | 886 mAh/g | 74.0% |
| Second Comparative Example | — | PAA | 1020 mAh/g | 59.0% |

From the comparison between Third Example and Fourth Example, using a polyacrylic acid (or PAA) was found out to be more preferable than using polyvinylidene fluoride (or PVdF) as a binder when the nanometer-size silicon material, which was made from the lamellar polysilane produced by the production process directed to Second Example, was used for a negative-electrode active material. Moreover, when a polyacrylic acid (or PAA) was set as a binder, using the nanometer-size silicon material was also found out to be more desirable than using the Si particles as a negative-electrode active material.

Figure 6:
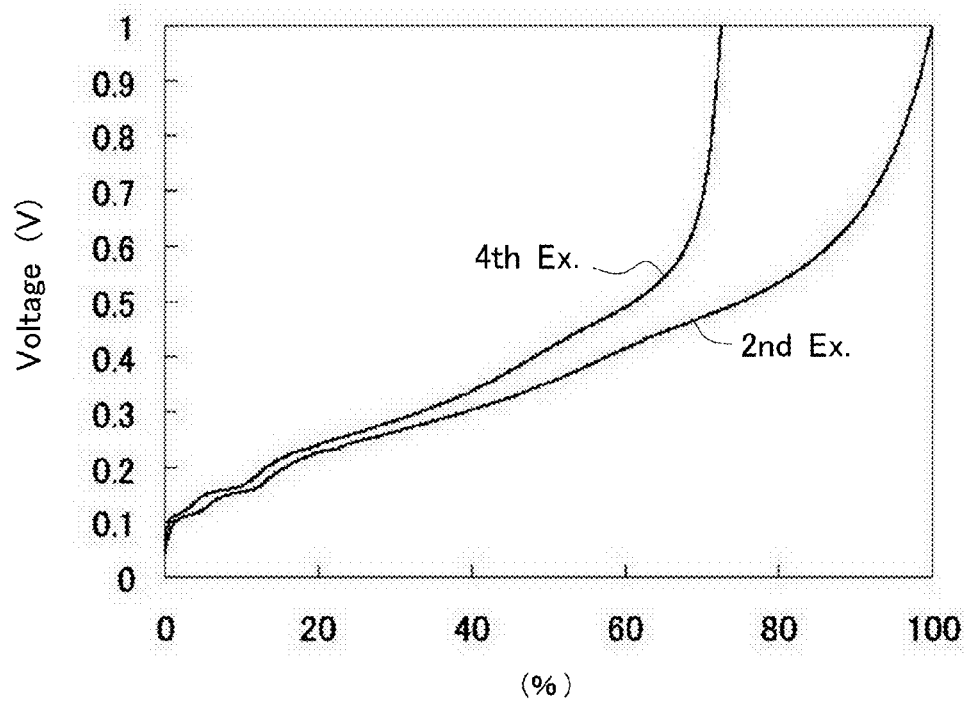
FIG. 6 shows charging curves of lithium-ion secondary batteries directed to Second and Fourth Examples.
Figure 7:
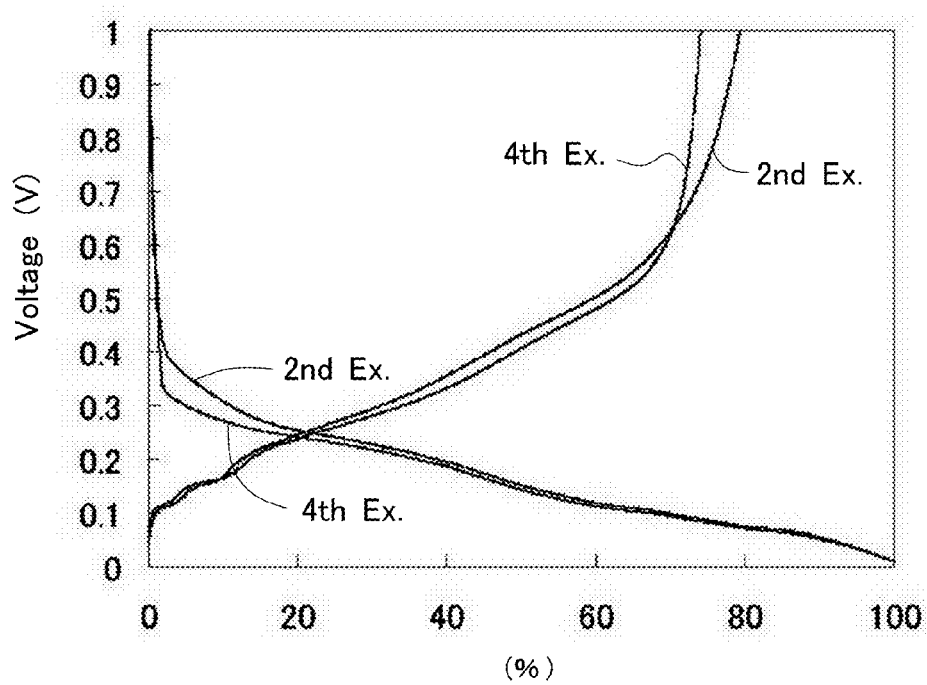
FIG. 7 shows charging and discharging curves of the lithium-ion secondary batteries directed to Second and Fourth Examples.
Figure 8:
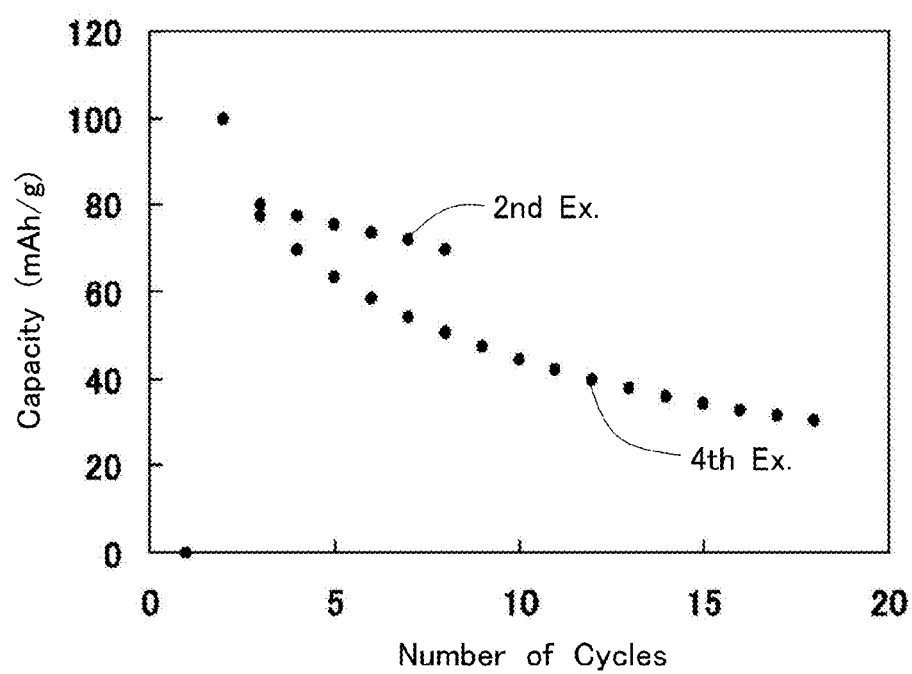
FIG. 8 shows relationships between the number of cycles and the capacities exhibited by the lithium-ion secondary batteries directed to Second and Fourth Examples.

FIG. 6 shows initial charging curves of the lithium secondary batteries according to Second Example of which the binder was PAI and Fourth Examples of which the binder was PVdF upon charging the lithium secondary batteries with 1 V. The horizontal axis represents ratios when the charged capacities of the battery directed to Second Example were taken as 100, respectively. Moreover, FIG. 7 shows initial charging and discharging curves upon charging the batteries with 1 V. The horizontal axis represents ratios when each of the charged and discharged capacities was taken as 100. Moreover, FIG. 8 shows changes in the capacities when charging and discharging operations were repeated at a rate of 0.1 C and at 30° C.

Any of the diagrams show such a result that Second Example was more preferable than Fourth Example, and that using polyamide-imide (or PAI) was found out to be more desirable than using polyvinylidene fluoride (or PVdF) as a binder in the lithium battery in which the nanometer-size silicon material made from the lamellar polysilane produced by the production process directed to the Second Example was used as the negative-electrode active material.

Figure 9:
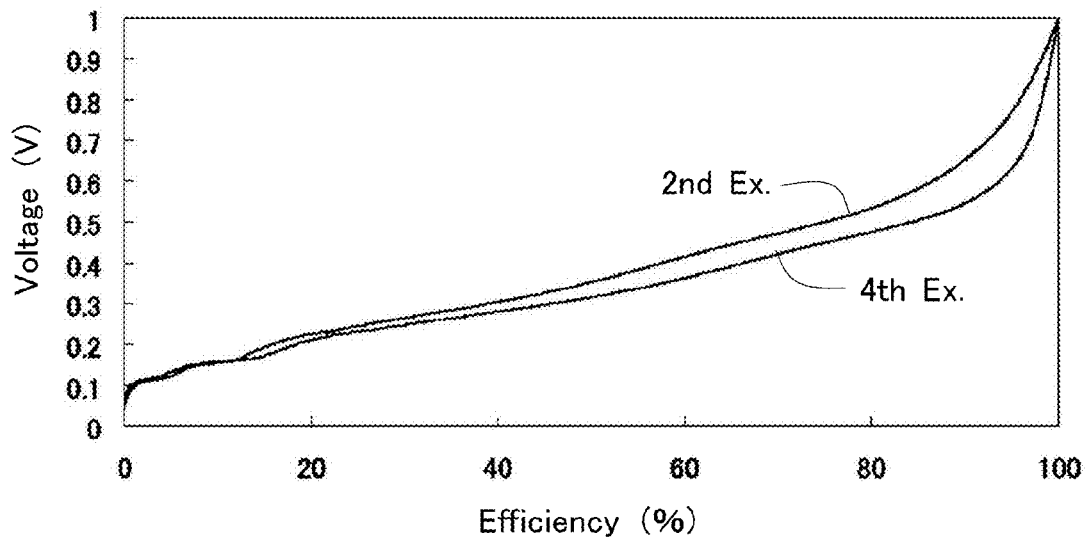
FIG. 9 shows other charging curves of the lithium-ion secondary batteries directed to Second and Fourth Examples.

Meanwhile, FIG. 9 shows charging curves when each of the charged capacities was taken as 100. Since using polyvinylidene fluoride (or PVdF) as a binder leads to enabling the potential of a negative electrode to lower, voltages are suggested to be upgradeable as a battery.

Fifth Example

Other than the following: using the lamellar polysilane formed in the same manner as Second Example; and setting the heat-treatment conditions at 800° C. for 1 hour, a nanometer-size silicon powder was prepared in the same manner as First Example. The nanometer-size silicon powder was used to form a negative electrode in the same manner as First Example. Then, a lithium secondary battery (i.e., a half cell) was fabricated in the same manner as First Example.

Third Comparative Example

The lamellar polysilane prepared in First Example was used instead of the nanometer-size silicon powder to form a negative electrode in the same manner as First Example. Then, a lithium secondary battery (i.e., a half cell) was fabricated in the same manner as First Example.

Test on Battery Characteristics

Figure 10:
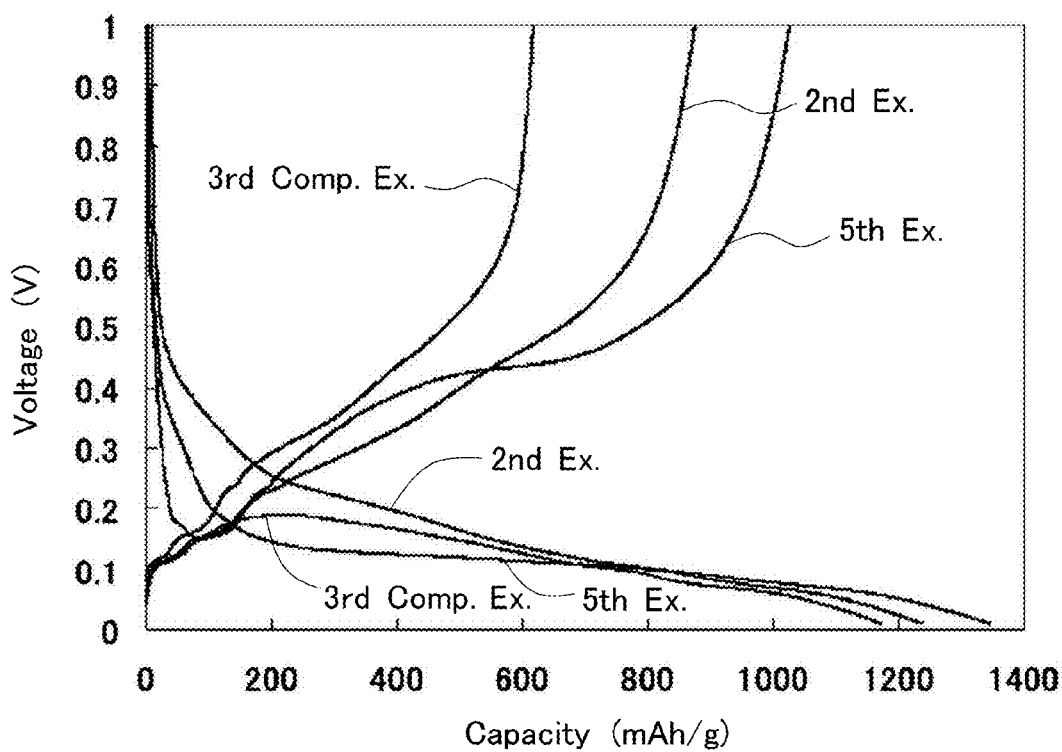
FIG. 10 shows charging and discharging curves of the lithium-ion secondary batteries directed to Second and Fifth Examples, and to Third Comparative Example.
Figure 11:
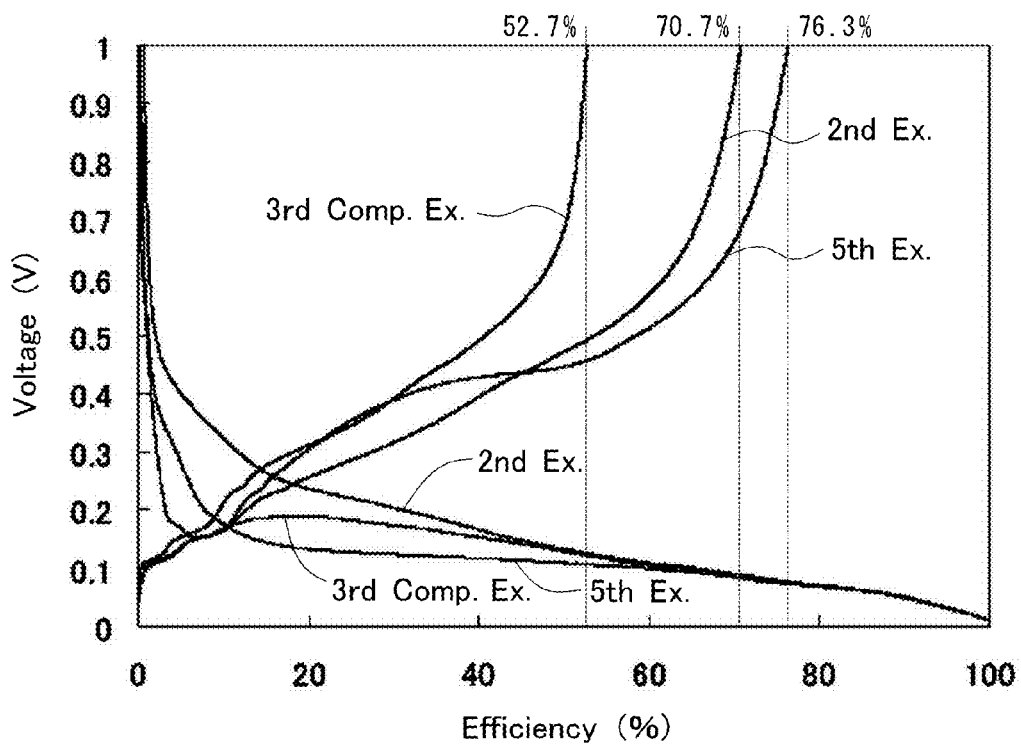
FIG. 11 shows other charging and discharging curves of the lithium-ion secondary batteries directed to Second and Fifth Examples, and to Third Comparative Example.

FIGS. 10 and 11 show the initial charging and discharging curves of the lithium secondary batteries according to Second and Fifth Examples and Third Comparative Example upon being charged with 1 V. The horizontal axis of FIG. 11 represents ratios when each of the discharged capacities was taken as 100. The following were found out from FIGS. 10 and 11: using the nanometer-size silicon material formed by the heat treatment more resulted in upgrading the initial efficiency remarkably than using the lamellar polysilane per se as a negative-electrode active material; and setting the heat-treatment temperature at 800° C. led to further upgrading the initial efficiency by 6% approximately.

Fourth Comparative Example

An SiO powder produced by Sigma Aldrich Japan Corporation and having an average particle diameter of 5 μm was heat treated at 900° C. for two hours, and thereby an SiO powder having an average particle diameter of 5 μm was prepared. Note that, when SiO is homogenous, solid silicon monoxide (SiO) of which the ratio between Si and O is 1:1 roughly, the heat treatment leads to decomposing the SiO into two phases, an Si phase and an $SiO_2$ phase, by the internal reactions of solid. The Si phase separated to be obtainable is very fine.

The $SiO_x$ powder was used instead of the nanometer-size silicon powder to form a negative electrode in the same manner as First Example. Then, a lithium secondary battery (i.e., a half cell) was fabricated in the same manner as First Example.

Test on Battery Characteristics

Figure 12:
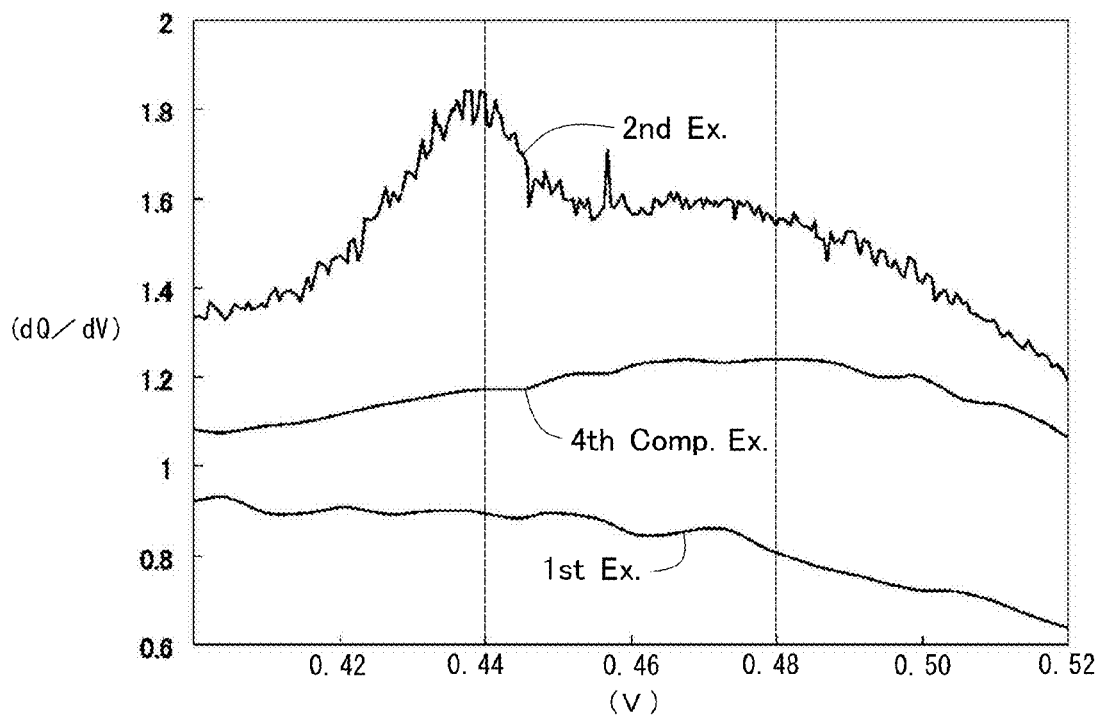
FIG. 12 shows V-dQ/dV curves of the lithium-ion secondary batteries directed to First and Second Examples, and to Fourth Comparative Example.

The lithium secondary batteries according to First and Second Examples and Fourth Comparative Example were measured, respectively, for the relationship between the voltage (V) and dQ/dV, namely, a proportion of the variation magnitude (dQ) of charged capacities (Q) with respect to the variation magnitude (dV) of voltages (V) of the negative electrode when being charged at a rate of 0.1 C, and then the V-dQ/dV curves shown in FIG. 12 were prepared. And, a value of the dQ/dV when the voltage (V) was 0.48V, and another value of the dQ/dV when the voltage was 0.44V were read out from the graphs to compute proportions of the dQ/dV values when the voltage (V) was 0.44 V with respect to the dQ/dV values when voltage (V) was 0.48V. Table 5 shows the results.

TABLE 5

| | 0.44 V/0.48 V |
|---|---|
| First Example | 1.09 |
| Second Example | 1.19 |
| Fourth Comparative Example | 0.95 |

From Table 5, the following were found out: the lithium-ion secondary battery according to Second Example exhibited 1.19 for the proportion of the dQ/dV value when the voltage (V) was 0.44 V with respect to the other dQ/dV value when the voltage (V) was 0.48 V; and the proportion was higher than the proportions exhibited by First Example and Fourth Comparative Example. Therefore, knowing that 1.10 or more is the proportion of a dQ/dV value when the voltage (V) is 0.44 V with respect to another dQ/dV value when the voltage (V) is 0.48 V leads to making identifiable a lithium secondary battery possessing a negative-electrode active material comprising the nanometer-size silicon material produced by the second production process according to the present invention.

Comparison Between Nanometer-Size Silicon Material According to Second Example and $SiO_x$ According to Fourth Comparative Example FIGS. 13 and 14 show SEM images of nanometer-size silicon particles in the nanometer-size silicon material obtained in Second Example. The nanometer-size silicon particles comprise a structure made by laminating a plate-shaped silicon body in a quantity of multiple pieces one after another in the thickness direction. Note that FIG. 14 shows a diagram in which the rectangled part shown in FIG. 13 is enlarged. Although the plate-shaped silicon bodies are observed to have a thickness of from about 10 nm to about 100 nm, a preferable thickness of the plate-shaped silicon bodies falls in a range of from 20 nm to 50 nm, from such viewpoints as the strength and the easiness of inserting lithium ions and so on thereinto and separating the ions therefrom. Moreover, the plate-shaped silicon bodies had actually a long-axis-direction length of from 0.1 μm to 50 μm, respectively. Preferable plate-shaped silicon bodies are believed to exhibit such an aspect ratio (i.e., "the long-axis-direction length"/"thickness") as from 2 to 1,000, respectively.

The plate-shaped silicon bodies were further observed with TEM (i.e., transmission electron microscopy)/EELS (i.e., electron energy loss spectroscopy). As shown in FIG. 15, a shaded stripe-shaped structure is noticeable in the plate-shaped silicon bodies. Note that FIG. 15 corresponds to a diagram in which the squared part shown in FIG. 14 is enlarged, and that FIG. 16 shows a schematic cross-sectional diagram illustrating a major part of the plate-shaped silicon bodies enlargedly. The light gray-colored parts shown in FIG. 15 are believed to have a structure in which flat-shaped nanometer-size silicon particles "1" are oriented perpendicularly with respect to the long sides to arrange lamellarly; whereas the dark gray-colored parts existing between layers of the respective flat-shaped nanometer-size silicon particles "1" are believed to be voids and/or silicon oxides "2." The flat-shaped nanometer-size silicon particles "1" have a long-axis-direction length "a" of from 5 nm to 20 nm, have a short-axis-direction length "b" of from 2 to 5 nm, and have a ratio "a/b," namely, a ratio between the long axis and the short axis, which falls in a range of from 2.5 to 10. Moreover, a thickness of the voids and/or silicon oxides "2" is from 2 nm to 10 nm, and accordingly a ratio of the thickness of the voids and/or silicon oxides "2" with respect to the thickness of the flat-shaped nanometer-size silicon particles "1" falls in a range of from 0.1 to 1.0.

Figure 17:
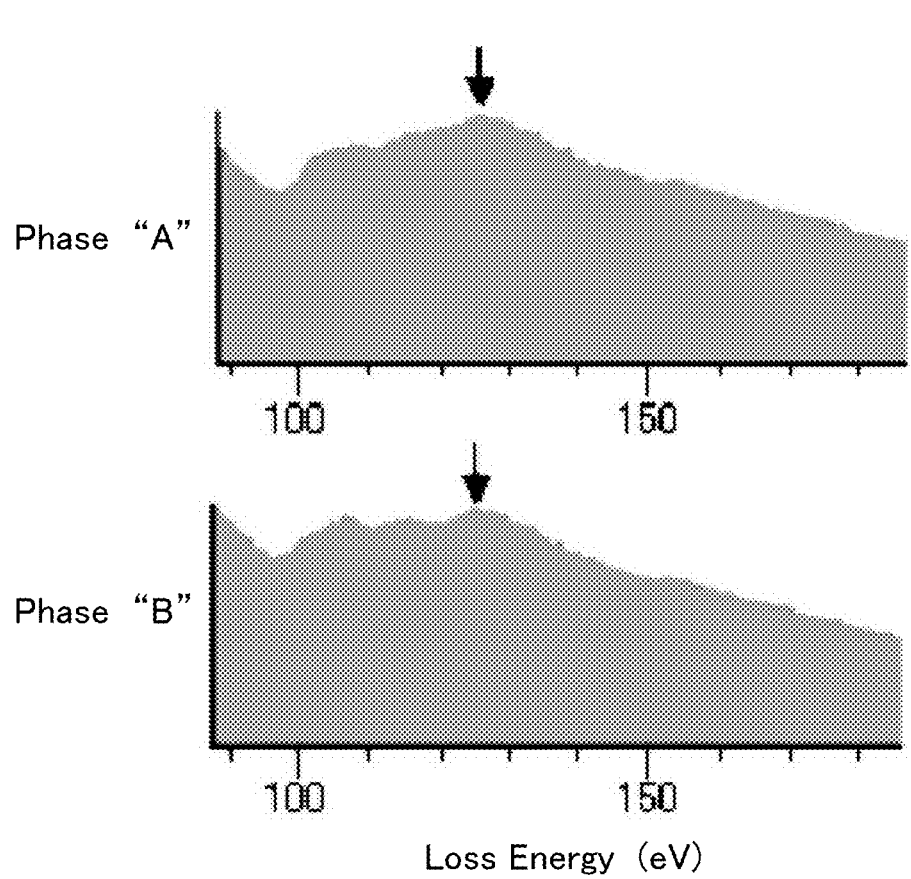
FIG. 17 shows an EELS spectrum of the plate-shaped silicon body directed to Second Example.

From a TEM/EELS spectrum, an occupancy ratio of the silicon (Si) phase in the plate-shaped silicon bodies was found as described below. First of all, an EELS map data with 2,500 (=50×50) pixels was acquired. EELS spectrum data ($S_{ij}$) were stored in each of the pixels at line "i" and column "j." The phase of the flat-shaped nanometer-size silicon particle "1" was labeled a phase "A"; whereas the phase of the voids and/or silicon oxides "2" was labeled a phase "B." FIG. 17 shows an EELS spectrum of a pixel in which the phase "A" occupies 100%, and another EELS spectrum of another pixel in which the phase "B" occupies 100%. For example, since peaks at parts designated with the arrows in FIG. 17 have different peak heights and peak positions between the phase and the phase "B," concentrations of the phase "A" and phase "B" by volumetric percentage in the respective pixels are findable from the following equations when the concentrations of the phase "A" and phase "B" are labeled "$CA_{ij}$" and "$CB_{ij}$," respectively, and the EELS spectrum data of the phase "A" and phase "B" are labeled "SA" and "SB," respectively.

$$S_{ij}=CA_{ij} \times SA + CB_{ij} \times SB$$

$$CA_{ij}+CB_{ij}=1$$

The "$CA_{ij}$" and "$CB_{ij}$" are found for all the pixels to compute the concentrations "CA" and "CB" of the phase "A" and phase "B" over a range of the measured spectrum from the following equations.

$$CA = \Sigma CA_{ij}$$

$$CB = \Sigma CB_{ij}$$

Then, "CA"/("CA"+"CB") is computed to determine an occupancy ratio of the silicon (Si) phase over a range of the measured spectrum.

When the aforementioned calculations were carried out for the measured range at five locations in the plate-shaped silicon bodies, an occupancy ratio of the silicon (Si) phase was from 40 to 60% by volume.

Figure 18:
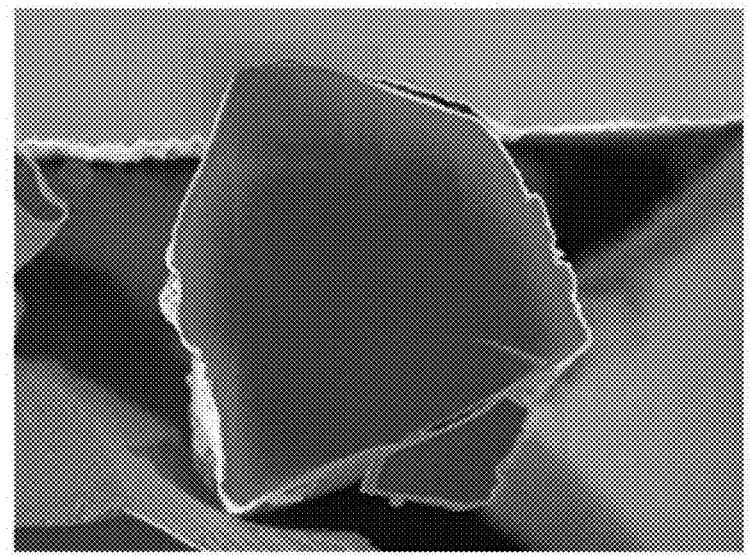
FIG. 18 shows an SEM image of $SiO_x$ particles used in Forth Comparative Example.
Figure 19:
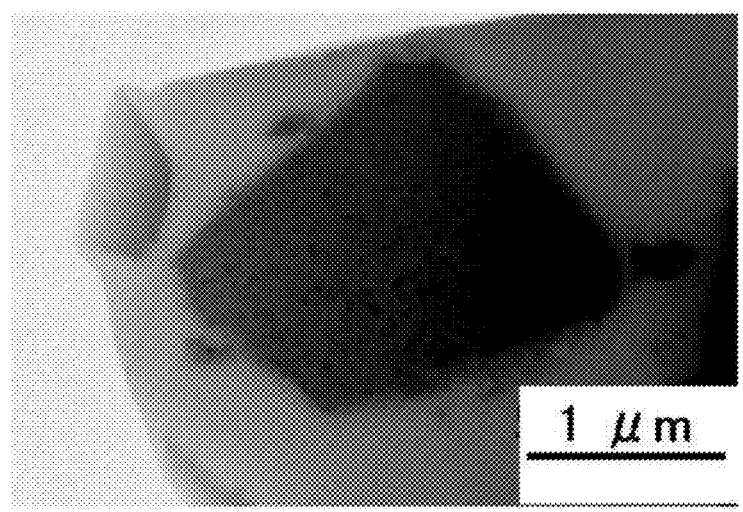
FIG. 19 shows a TEM image of the $SiO_x$ particles used in Forth Comparative Example.

Meanwhile, FIG. 18 shows an SEM image of the $SiO_x$ particles used in Fourth Comparative Example, and FIG. 19 shows a TEM image thereof. From FIG. 18, the $SiO_x$ particles were found to be agglomerated particles, and to have random configurations. Moreover, from the TEM measurement, the $SiO_x$ particles were judged to be in such a state as nanometer-size Si particles of which the diameter was from 2 nm to 6 nm were dispersed in an $SiO_2$ matrix.

The lithium secondary batteries fabricated in Second Example and Fourth Comparative Example were compared with each other for the battery performance as described below. The results are shown in Table 6.

Charging and discharging operations were carried out with a constant electric current of 0.1 mA while setting a final charging voltage at 1.0 V against the Li counter electrode and setting a final discharging voltage at 0.01 V against the Li counter electrode, and then a charged capacity, and a discharged capacity were measured. The charged capacity on the occasion was labeled an initial capacity, and (the charged capacity)/(the discharged capacity) was labeled an initial coulomb efficiency. Moreover, a 1 C electric current was determined with reference to a standard, namely, an electric current obtained in a 0.01 C charging/discharging test, and then a capacity ratio between 0.3 C and 5 C electric-current values was evaluated. Table 6 shows the results.

TABLE 6

|  | Initial Capacity (mAh/g) | Initial Coulomb Efficiency (%) | 5 C/0.3 C (%) |
|---|---|---|---|
| Second Example | 1180 | 73 | 52 |
| Fourth Comparative Example | 670 | 65 | 39 |

Since voids existed between the respective layers of the flat-shaped nanometer-size silicon particles in the negative electrode of the battery according to Second Example, the irreversible reaction occurred less between Li and $SiO_2$, compared with the $SiO_x$ not possessing such voids, so that the initial efficiency was improved. Moreover, since the flat-shaped nanometer-size silicon particles, which had a large ratio between the long-axis length and the short-axis length (i.e., "the long axis"/"short axis"), were arranged lamellarly one after another regularly, the reaction efficiency was high between Li and Si, the efficiency resulting from electric-current density was inferred to improve.

Industrial Applicability

The nanometer-size silicon material according to the present invention is utilizable as a negative-electrode active material for electric storage apparatuses, such as secondary batteries, electric double-layer capacitors and lithium-ion capacitors. And, since the negative-electrode active material has a smaller specific surface area and a less included-oxygen amount than ordinary nanometer-size Si materials have, the electric storage apparatuses are useful for non-aqueous-system secondary batteries utilized for driving the motors of electric automobiles and hybrid automobiles, and for personal computers, portable communication gadgets, home electric appliances, office devices, industrial instruments, and so forth. In particular, the electric storage apparatuses are usable suitably for driving the motors of electric automobiles and hybrid automobiles requiring large capacities and large outputs.

Moreover, since compositing the nanometer-size silicon material according to the present invention with the other materials is possible because of the controllable specific surface area in size, the present nanometer-size silicon material is utilizable as semiconductor materials, such as CMOS, semiconductor memories, photovoltaic-cell ingredients and photocatalyst ingredients, for instance.

The invention claimed is:

1. A production process for nanometer-size silicon material comprising: reacting a mixture of hydrogen fluoride (HF) and hydrogen chloride (HCl) with calcium disilicide ($CaSi_2$) to obtain a lamellar polysilane; and
heat treating the lamellar polysilane r at a temperature beyond 300° C. under a nonoxidizing atmosphere.

2. The production process for nanometer-size silicon material as set forth in claim 1, wherein a nitrogen-gas atmosphere is excepted from said nonoxidizing atmosphere.

3. The production process for nanometer-size silicon material as set forth in claim 1, wherein said nanometer-size silicon material has a specific surface area of 55 $m^2$/g or less measured by a BET method.

4. The production process for nanometer-size silicon material as set forth in claim 1, wherein said nanometer-size silicon material has a specific surface area of 25 $m^2$/g or less measured by a BET method.

5. The production process for nanometer-size silicon material as set forth in claim 1, wherein said nanometer-size silicon material includes oxygen in an amount of 30% by mass or less.

6. The production process for nanometer-size silicon material as set forth in claim 1, wherein said nanometer-size silicon material includes oxygen in an amount of 15% by mass or less.

7. The production process for nanometer-size silicon material as set forth in claim 1, wherein said nanometer-size silicon material includes oxygen in an amount of 10% by mass or less.

8. The production process for nanometer-size silicon material as set forth in claim 1, wherein said nanometer-size silicon material has a crystallite size of from 1 nm to 50 nm, the crystallite size computed by the Scherrer equation from a half-value width of a diffraction peak in the (111) plane according to the result of an X-ray diffraction measurement.

* * * * *

UNITED STATES PATENT AND TRADEMARK OFFICE
CERTIFICATE OF CORRECTION

PATENT NO. : 9,527,748 B2
APPLICATION NO. : 14/441883
DATED : December 27, 2016
INVENTOR(S) : Yusuke Sugiyama et al.

It is certified that error appears in the above-identified patent and that said Letters Patent is hereby corrected as shown below:

In Claim 1 at Column 20, Line 47:
Delete "r".

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*